United States Patent [19]

Boden

[11] Patent Number: 4,722,994

[45] Date of Patent: Feb. 2, 1988

[54] METHOD OF PREPARING CYCLIC OLIGOMERIC POLYCARBONATES

[75] Inventor: Eugene P. Boden, Scotia, N.Y.

[73] Assignee: General Electric Company, Schenectady, N.Y.

[21] Appl. No.: 21,079

[22] Filed: Mar. 3, 1987

[51] Int. Cl.$^4$ .............................................. C08G 63/62
[52] U.S. Cl. .................................... 528/196; 528/198; 528/199
[58] Field of Search ....................... 528/196, 198, 199

[56] References Cited

U.S. PATENT DOCUMENTS

| 4,139,687 | 2/1979 | Sannes | 528/199 |
| 4,197,394 | 4/1980 | Hallgren | 528/199 |
| 4,644,053 | 2/1987 | Brunelle et al. | 528/371 |

Primary Examiner—Harold D. Anderson
Attorney, Agent, or Firm—William H. Pittman; James C. Davis, Jr.; James Magee, Jr.

[57] ABSTRACT

A catalyzed interfacial polycondensation aromatic polycarbonate process comprising mixing a water soluble metal salt of a dihydric phenol with an aqueous solution of a strong base and a polymerization catalyst in an inert organic solvent; heating the mixture; concurrently adding a carbonyl halide, additional strong base and additional water soluble metal salt of a dihydric phenol to the heated mixture to form the cyclic oligomeric polycarbonate; and recovering the cyclic oligomeric polycarbonate. The preferred process utilizes the di-sodium salt of bisphenol-A, triethylamine polymerization catalyst and methylene chloride solvent with phosgene to form the cyclic oligomeric polycarbonates. The cyclic oligomeric polycarbonate products are accumulated in the organic phase of the reaction mixture and recovered therefrom by conventional techniques.

12 Claims, No Drawings

METHOD OF PREPARING CYCLIC OLIGOMERIC POLYCARBONATES

BACKGROUND OF THE INVENTION

This invention relates to a method for preparing cyclic oligomeric polycarbonates from dihydric phenols and carbonyl halides, and more specifically, a method of preparing cyclic oligomeric polycarbonates from the water soluble metal salts of dihydric phenols and carbonyl halides by interfacial polymerization.

Polycarbonates are typically produced by the reaction of dihydric phenols such as, bisphenol, with a carbonyl halide such as, phosgene, by an interfacial reaction using a mixed aqueous/organic system which results in the recovery of the carbonate in the organic phase. Low molecular weight cyclic aromatic carbonate polymers and their preparation are described in U.S. Pat. Nos. 3,155,683, 3,274,214 and 3,422,119. The cyclic polymers disclosed therein are single compounds. In U.S. Pat. No. 3,155,683, the cyclic aromatic carbonates are prepared by reacting together in an inert organic solvent containing an acid acceptor and as the sole reactive ingredients, water and a specified class of bishaloformate. A typical acid acceptor is pyridine, and the bishaloformates are typically bischloroformates derived from 2,2Bis-(4-hydroxyphenyl) propane. The acid acceptor in U.S. Pat. No. 3,155,683 is typically a tertiary amine, such as triethylamine, or an alkali metal oxide or hydroxide or an alkaline earth metal oxide or hydroxide. Cyclic polycarbonate oligomers are also prepared from bischloroformates as described in U.S. Pat. No. 4,616,077. The preparation of cyclic polycarbonate oligomer mixtures is described in U.S. Pat. No. 4,644,053, the disclosure of which is incorporated herein by reference. In that patent, the preparation of the mixtures is typically by the reaction of a corresponding bischloroformate composition with an alkali metal hydroxide and a tertiary amine.

In U.S. Pat. No. 3,274,214, cyclic aromatic dimers and trimers are prepared by contacting, in the presence of an acid acceptor, a specified class of dihydric phenol with a carbonyl halide to provide a reaction mixture containing the cyclic carbonate polymer. In U.S. Pat. No. 3,422,119, a cyclic carbonate dimer is prepared by reacting in the presence of an acid acceptor, a dihydric phenol of specified formula with a bishaloformate of a dihydric phenol of a specified formula.

When an ortho-bisphenol is reacted with a carbonyl halide in the presence of an acid acceptor which is essentially a weak base of the order of basicity of a tertiary amine, a cyclic carbonate monomer is produced, but if the reaction of a carbonyl halide with an orthobisphenol is carried out in the presence of an acid acceptor which is a strong base, such as sodium hydroxide, the resultant product is the expected linear carbonate polymer as disclosed in U.S. Pat. No. 3,221,025. However, in U.S. Pat. No. 3,221,025, when a carbonyl halide reacts with a bisphenol, other than an ortho-bisphenol, such as a para- or a meta-bisphenol, in the presence of a weak base such as a tertiary amine, linear carbonate polymers are formed. Other cyclic carbonates, such as cyclic carbonate trimer, are prepared by methods as discussed in U.S. Pat. Nos. 4,129,574, 4,139,687 and 4,197,394.

In U.S. Pat. No. 4,368,315, there is described a catalyzed equilibrated interfacial polycondensation aromatic polycarbonate process wherein an equilibrated, substantially uniform agitated two-phase admixture containing an organic phase with inert solvent and an aqueous phase with a solution of an aromatic dihydroxy compound and a strong base, is formed, and a carbonyl halide is added thereto and reacted with the aromatic dihydroxy compound to form an aromatic polycarbonate. In U.S. Pat. No. 4,368,315, substantially all of the polycarbonate formed during the reaction precipitates in-situ in the aqueous phase in particulate form. In the critical process sequence of U.S. Pat. No. 4,368,315, an equilibrated, substantially uniform agitated two-phase admixture is formed and contains an organic phase containing inert solvent and a polycondensation catalyst and an aqueous phase containing a solution of an aromatic dihydroxy compound, and a strong base having a pH of at least about 11, subject to the proviso that the volume ratio of inert organic solvent phase to aqueous phase is within the range of from 0.04:1 to 0.20:1, and the mole ratio of the base to aromatic dihydroxy compound is at least about 0.25:1. The carbonyl halide is added to and reacted with the aromatic dihydroxy compound to form an aromatic polycarbonate having a molecular weight of at least about 2,000. The solid aromatic polycarbonate particulate is separated and recovered from the liquid aqueous phase. The polycarbonates prepared by the process of U.S. Pat. No. 4,368,315 are preferably non-sterically-hindered aromatic polycarbonates.

Many of the foregoing processes are multi-step processes and are disadvantageous because of the excessive amounts of carbonyl halide, such as phosgene, required to carry out and complete the reaction. In those processes where cyclic oligomeric polycarbonates are prepared by the hydrolysis of bischloroformates and equivalent reactions, half of the chloroformates are lost to hydrolysis, thereby leading to insufficient utilization of the carbonyl halide. Furthermore, in many of the prior art processes, an excessive amount of the linear polycarbonates are formed along with the cyclic polycarbonates and/or high polymer products are formed along with the desired low polymer products during the reaction.

SUMMARY OF THE INVENTION

Accordingly, it is the primary object of the present invention to provide an improved process for preparing cyclic oligomeric polycarbonates.

It is another object of the present invention to reduce the number of steps required in the process of preparing cyclic oligomeric polycarbonates from the reaction of dihydric phenols and carbonyl halides.

It is another object of the present invention to provide a method of preparing cyclic oligomeric polycarbonates directly from derivatives of dihydric phenols and carbonyl halides.

It is another object of the present invention to provide a method of preparing cyclic oligomeric polycarbonates while reducing or preventing the formation of low molecular weight linear polymers.

It is still another object of the present invention to provide a method of preparing cyclic oligomeric polycarbonates having a low number of monomer units in the polymer while reducing or preventing the formation of low molecular weight linear polymers.

These and other objects are achieved by preparing cyclic polycarbonates directly from a carbonyl halide, such as phosgene, and the water soluble metal salts of dihydric phenols in a catalyzed interfacial polymerization process. In accordance with the process of the present invention, cyclic oligomeric polycarbonates are made by adding a strong base to the aqueous solution of a water soluble metal salt of a dihydric phenol and a polymerization catalyst in an inert organic liquid; heating the mixture; and adding a carbonyl halide, additional strong base and additional water soluble metal salt of a dihydric phenol to the heated mixture to form the cyclic oligomeric polycarbonate. The cyclic oligomeric polycarbonate is recovered from the organic phase of the mixture. In accordance with preferred aspects of the present invention, cyclic oligomeric bisphenol-A polycarbonates have been prepared in essentially a one-step condensation reaction between phosgene and an aqueous di-sodium salt of bisphenol-A and sodium hydroxide in a methylene chloride mixture containing triethylamine when the phosgene is added concurrently with additional di-sodium salt of bisphenol-A and additional sodium hydroxide to maintain a strongly alkaline mixture as shown in the following chemical reaction which produces an oligomeric polycarbonate where n is about 2 to about 30.

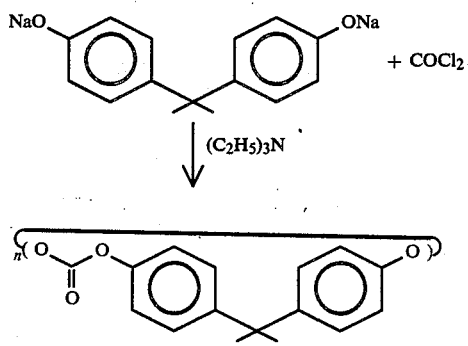

Although it has been found that polymer levels are higher than those obtained by means of the hydrolysis-condensation of oligomeric bischloroformates, the single-step process is more convenient because of the simplicity of the reaction and because of the increase in utilization of phosgene.

In accordance with the present invention, the substantially high pH in the reaction medium; the reaction at the temperature of the medium when it is maintained at an elevated temperature near the reflux temperature of the medium; and the constant level of condensation catalyst maintained throughout the reaction, are critical not only in producing the low levels of polymer, but also in substantially reducing or preventing the formation of low molecular weight linear polymers. The maintenance of a constant level of condensation catalyst, such as triethylamine, throughout the entire reaction is critical in the process of the present invention to prevent the production of significant amounts of oligomeric linear polycarbonate products.

DETAILED DESCRIPTION OF THE INVENTION

In the interfacial polycondensation process for making cyclic oligomeric polycarbonates of the present invention wherein the water soluble metal salt of a dihydric phenol is reacted with a carbonyl halide, it is critical that the process sequence and various parameters be followed in order to produce the cyclic oligomeric polycarbonates while at the same time increasing carbonyl halide utilization. In order to achieve the foregoing, a carbonyl halide, strong base and water soluble metal salt of a dihydric phenol are concurrently added over a period of time preferably from about 5 to about 30 minutes to a heated mixture, preferably heated at the reflux temperature of the mixture, the heated mixture comprising a portion of the water soluble metal salt of a dihydric phenol, an aqueous solution of a strong base to maintain the pH of the mixture between about 11 and 14, and all of the polymerization catalyst in an inert organic liquid. For example, when phosgene is added over a period from about 5 minutes to about 30 minutes concurrently with the water soluble di-sodium salt of bisphenol-A and a sufficient amount of strong base to prevent the pH of the mixture to which it is added from decreasing below a pH of about 11.0, to a heated, agitated mixture, which is preferably at the reflux temperature of the mixture, wherein the mixture already contains about 10 to about 20 percent by weight of the di-sodium salt of bisphenol-A in water and enough aqueous strong base so that the pH of the mixture is at least about 11.0, and wherein the mixture also contains all of the polymerization catalyst, in an inert organic solvent such as methylene chloride, a product containing substantially all cyclic oligomeric polycarbonates containing low levels of polymer, is formed in a two-phase polycondensation reaction. The high pH, the reaction at an elevated temperature, such as the reflux temperature, and a constant level of polycondensation catalyst are required to produce low levels of polymer while preventing the formation of low molecular weight linear polycarbonates.

In one preferred aspect of the present invention for making cyclic oligomeric polycarbonates from a water soluble metal salt of a dihydric phenol, such as the di-sodium salt of bisphenol-A, the process comprises, heating a first portion of about 10% to about 20% by weight (based on the total weight of the water soluble metal salt of the dihydric phenol used in the process) of the water soluble metal salt of a dihydric phenol in water with a sufficient amount of an aqueous solution of a strong base to adjust the pH of the mixture to at least about 11 and a polymerization catalyst such as, triethylamine, in an inert organic liquid such as, methylene chloride, the amount of catalyst being about 0.02M up to about 0.10M of catalyst; concurrently adding a second portion of (additional) strong base to maintain the pH of the mixture at about 11.0, a second portion of about 90% to about 80% by volume of the water soluble metal salt of a dihydric phenol and carbonyl halide to the agitated two-phase mixture containing the first portion of strong base and metal salt to form the cyclic oligomeric polycarbonate after the reaction with carbonyl halide has begun; and recovering the cyclic oligomeric polycarbonate.

The cyclic oligomeric polycarbonates of the present invention are derived from any of the well-known water soluble metal salts of dihydric phenols. The preferred metal salts of dihydric phenols have the formula:

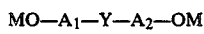

wherein each of $A_1$ and $A_2$ is a monocyclic divalent aromatic radical; Y is a bridging radical in which one or two atoms separate $A_1$ and $A_2$; and M is an alkali metal or an alkaline earth metal. The most preferred metal for the metal salt of a dihydric phenol useful in the present invention is sodium. Other preferred metals include potassium, lithium, calcium and magnesium. Only those metal salts of a dihydric phenol which are water soluble, may be used in the process of the present invention. The free valence bonds in the foregoing formula are usually in the meta or para positions of $A_1$ and $A_2$ in relation to Y.

In the foregoing formula the $A_1$ and $A_2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A_1$ and $A_2$ are preferably p-phenylene, although both may be o- or m-phenylene or one o- or m-phenylene and the other p-phenylene.

The bridging radical, Y, is one in which one or two atoms, preferably one, separate $A_1$ from $A_2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The metal salts of dihydric phenols used in the present invention may be considered as being derived from dihydroxy aromatic compounds of the formula HO—R—OH (or the corresponding dithio compounds), especially dihydroxyaromatic compounds and preferably bisphenols of the formula HO—$A_1$—Y—$A_2$—OH. The following dihydroxy aromatic compounds are illustrative:

1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
a,a'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3,5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
a,a-Bis(4-hydroxyphenyl)toluene
a,a,a',a'-Tetramethyl-a,a'-bis(4-hydroxyphenyl)p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

The preferred dihydric phenol from which the metal salt of a dihydric phenol is derived, is bisphenol-A for reasons of availability and particular suitability for the purpose of the invention. Thus, the preferred metal salt of a dihydric phenol is the metal salt of bisphenol-A, and since the preferred metal is sodium, the preferred metal salt of a bisphenol-A is the di-sodium salt of bisphenol-A.

The metal salts of a dihydric phenol which may be used in the process of the present invention, are readily available. One method of preparing the metal salt is by treating the dihydric phenol with an alkaline earth metal oxide or hydroxide or an alkali metal oxide or hydroxide. For example, the dihydric phenol such as, bisphenol-A, is mixed with sodium hydroxide, potassium hydroxide or lithium hydroxide and the like in water at ambient temperature, preferably in an inert atmosphere, to form the di-metal salt of the dihydric phenol. The di-metal salts of the dihydric phenols are generally anhydrous solids.

In the process of the present invention, a first portion of the water soluble metal salt of a dihydric phenol (preferably dissolved in water) is mixed with an aqueous solution of a strong base and all of the polymerization catalyst in an inert organic liquid. The foregoing mixture is agitated to form a two phase interfacial reaction medium as well known in the art and heated, preferably at the reflux temperature of the mixture, prior to the concurrent addition of the carbonyl halide and other ingredients. Since the metal salt of a dihydric phenol is one which is water soluble, it must be dissolved in water and/or added to an aqueous solution to form the mixture for the two-phase interfacial polycondensation reaction. There must be sufficient water in the mixture to dissolve the water soluble metal salt of a dihydric phenol therein and to maintain the water soluble metal salt of a dihydric phenol in solution when the additional water soluble metal salt of a dihydric phenol is added to the heated mixture. The amount of water is not critical as long as there is a sufficient amount to maintain the metal salt of the dihydric phenol in solution during the mixing and concurrent addition of the second portion of (additional) metal salt of the dihydric phenol and additional strong base and to maintain a two-phase mixture for the interfacial polycondensation reaction. Generally, the amount of water in the mixture is about 10% to about 60% by volume of the total water/organic liquid mixture.

Any inert non-polar to medium-polar liquids or solvents which are capable of forming a two-phase system with the aqueous phase of the mixture, can be used in the process of the present invention. The identity of the inert organic solvent or liquid is not critical, provided it possesses the stated properties. Illustrative inert organic solvents include aromatic hydrocarbons such as toluene, xylene, benzene, chlorobenzene, o-dichlorobenzene, and nitrobenzene; halogenated hydrocarbons, such as the chlorinated hydrocarbons including chloroform and methylene chloride, and the like and mixtures thereof. The preferred inert organic solvents are the halogenated hydrocarbons, more preferably, methylene chloride.

As indicated above, the polycondensation polycarbonate process of the present invention is an interfacial polycondensation in which there is formed a two-phase admixture containing an organic phase which contains the inert solvent or liquid and the polymerization or polycondensation catalyst and an aqueous phase containing the water soluble metal salt of a dihydric phenol or mixtures thereof and the strong base. As indicated above, the amount of the organic phase to the amount of the aqueous phase is not critical as long as the two phases are present in sufficient amounts to carry out the interfacial polycondensation reaction of the present invention; as long as there is a sufficient amount of water in the aqueous phase to maintain the solubility of the water soluble metal salt of a dihydric phenol along with the strong base; and as long as there is a sufficient amount of solvent in the organic phase to maintain the relationship of the metal salt of a dihydric phenol to solvent at no more than about 0.3 Molar. The amount of inert organic solvent in the mixture is not critical and in preferred embodiments varies from about 40% by volume to about 90% by volume of the total water/organic solvent mixture. Thus, when the aqueous phase is 10% by volume of the mixture, the organic solvent phase is about 90% by volume of the mixture, and when the aqueous phase is about 60% by volume of the mixture, the organic solvent phase of the mixture is about 40% by volume of the mixture.

The interfacial polymerization is carried out in any strongly basic aqueous reaction medium, that is, one having a pH of about 11 or higher which is provided by the presence of the strong base or mixtures of strong bases. Illustrative of the strong bases which may be used in the process of the present invention, are the aqueous alkali or alkaline earth metal hydroxides or carbonate solutions, such as, lithium hydroxide, sodium hydroxide, potassium hydroxide, calcium hydroxide, or sodium carbonate or potassium carbonate. Sodium hydroxide is generally the preferred strong base used in the process of the present invention. The concentration of the strong base is not critical and may be about 0.1 to about 16M.

The polymerization or polycondensation catalyst which is added in its entirety to the mixture prior to the concurrent addition of the carbonyl halide, the second portion of (additional) strong base and the second portion of (additional) water soluble metal salt of a dihydric phenol, can be any hydrogen halide acceptor commonly employed in interfacial polycondensation reactions as well known in the art. The most commonly used hydrogen halide acceptors are tertiary amines having up to about 6 carbon atoms. The amines most useful as the polymerization catalyst of the present invention are trialkylamines containing no branching on the carbon atom in the one- and two-positions. Especially preferred are the tri-n-alkylamines in which the alkyl groups contain about 2–4 carbon atoms. Triethylamine is the most preferred because of its availability, low cost and effectiveness in the preparation of products containing little or no linear oligomers and a relatively small proportion of high polymers.

A constant level of the polymerization catalyst present in an effective amount to produce the lowest levels of polymer without producing significant amounts of oligomeric linears, is critical in the process of the present invention. The polymerization catalyst is soluble in the organic phase of the mixture, and the water soluble metal salt of a dihydric phenol is soluble in the aqueous phase of the mixture, and substantially low concentrations of the polymerization catalyst are required in order to form the cyclic oligomeric polycarbonates. It is the combined effect of the concentration of the polymerization catalyst which is maintained at a constant level in the organic phase of the interfacial polycondensation mixture, with the maintenance of the water soluble metal salt of the dihydric phenol in the aqueous phase of the interfacial polycondensation mixture which results in the formation of the cyclic oligomeric polycarbonates having low levels of polymer with the formation of little or no low molecular weight linear polycarbonates. As previously noted, the effective amount of catalyst which forms the cyclic oligomeric polycarbonates of the present invention, is generally from about 0.02M up to about 0.10M.

As indicated above, the amount of polycondensation or polymerization catalyst employed in the process of the present invention is critical to prevent the formation of linear oligomeric polycarbonates. If the concentration of polycondensation catalyst is too low in the process, an unacceptably large amount of the polycarbonate product will be high polymer, and if a large excess of the polycondensation catalyst is used in the process, significant amounts of oligomeric linears are produced.

The carbonyl halides which are used in the process of the present invention, are those which are well-known in the art for the preparation of polycarbonates and include carbonyl dichloride, more commonly identified as phosgene, carbonyl dibromide, carbonyl diiodide, carbonyl difluoride, carbonyl chlorofluoride and mixtures thereof. Generally, about 1.0 to about 1.5 moles of the metal salt of a dihydric phenol is used per 1.0 mole of the carbonyl halide.

The carbonyl halides are added to the heated, agitated mixture containing the first portion of the water soluble metal salt of a dihydric phenol and the first portion of strong base in water and a polymerization catalyst in an inert organic solvent or liquid, and the polycondensation reaction, or phosgenation begins. In preferred embodiments, after the polycondensation reaction or phosgenation begins, the carbonyl halide is added over a period of time concurrently with a second portion of (additional) strong base to maintain the pH at about 11 or higher and concurrently with a second portion of (additional) water soluble metal salt of a dihydric phenol. In the process sequence of the present invention the water soluble metal salt of a dihydric phenol is introduced into the process in two portions or fractions. The first portion is mixed in the form of an aqueous solution with a first portion or fraction of strong base and a polymerization catalyst in an inert organic liquid, and the mixture is heated to form a heated mixture having the first portions of metal salt and strong base therein. The second portions of metal salt of a dihydric phenol and strong base are added concurrently with carbonyl halide to the heated, mixture containing the first portions of metal salt and strong base, preferably after phosgenation has begun.

Any amount of the second portion of (additional) strong base can be added to the heated mixture containing the first portions of strong base and metal salt, preferably heated at the reflux temperature of the mixture, with the proviso that the agitated two-phase mixture is maintained at a pH in excess of about 11, and more preferably within the range of about 12 to about 13.5. Generally, effective mole proportions of strong base relative to the water soluble metal salt of a dihydric phenol are within the range of from about 2:1 to about 5:1, and more preferably from about 2.1:1 to about 2.5:1.

The second portion of (additional) water soluble metal salt of a dihydric phenol is also added to the heated mixture containing the first portions of strong base and metal salt. As indicated above, there is no criticality in the amount of the first portion of water soluble metal salt of a dihydric phenol which is used in the heated mixture, and the amount of the second portion of (additional) water soluble metal salt of a dihydric phenol which is added to the agitated, heated mixture. In certain embodiments, from about 5% to about 25% by weight of the water soluble metal salt of a dihydric phenol can be used to make up the first portion of metal salt in the heated mixture, and from about 75% to about 95% by weight (based on the total weight of the water soluble metal salt of a dihydric phenol) can be added as a second portion of metal salt to the heated mixture.

The reaction is generally carried out at temperatures up to the reflux temperature of the inert organic solvent phase. Preferably, temperatures within the range of about 20° C. to about 60° C. may be employed in the process of the present invention.

The second portion of (additonal) strong base which is added to the heated mixture, may be dissolved in water in concentrations as discussed above for the aqueous solution of the first portion of strong base in the heated mixture. The additional water soluble metal salt of a dihydric phenol which is added to the heated mixture, may also be added to the heated mixture in the form of an aqueous solution of the metal salt of a dihydric phenol. In the process of the present invention, the water in the water phase may be derived from water added to the reaction vessel and having the anhydrous metal salt of a dihydric phenol added thereto as well as the strong base, and/or from water in which the water soluble metal salt of a dihydric phenol is dissolved, and/or from water in which the strong base is dissolved. Additional water for the aqueous phase may be added as desired and/or derived from the second portion of (additional) aqueous strong base and/or second portion of (additional) aqueous metallic salt of a dihydric phenol.

The addition of the carbonyl halide, additional strong base and additional water soluble metal salt of a dihydric phenol concurrently added to the mixture is preferably carried out over a period of time from about 5.0 minutes to about 30.0 minutes after the initial mixture has been heated and phosgenation has begun. The time of the concurrent addition is not critical, however, the level of polymer steadily increases with time as discussed below.

The reactions are carried out in conventional direct phosgenation equipment wherein a reaction flask is charged with the inert solvent, such as methylene chloride, with the first portion of strong base, such as aqueous sodium hydroxide, with all of the polymerization catalyst such as triethylamine, a first portion of the water soluble metal salt of a dihydric phenol, such as about 10 to about 20 percent of the di-sodium salt of bisphenol-A, and, optionally, water to provide the aqueous phase in the event any water in which the strong base and/or the water soluble metal salt of a dihydric phenol are dissolved, is inadequate to dissolve the water soluble moieties and/or to provide sufficient water for the aqueous phase of the two-phase mixture. The mixture containing the first portions of the metallic salt and strong base is heated to reflux and is sufficiently agitated to form a two-phase medium between the aqueous constituents and the organic solvent constitutents. Gaseous carbonyl halide such as phosgene, a second portion of (additional) strong base such as aqueous sodium hydroxide, and a second portion of (additional) aqueous solution of the water soluble metal salt of a dihydric phenol such as the di-sodium salt of bishpenol-A, are added to the mixture in the reaction flask, concurrently.

The cyclic oligomeric polycarbonates prepared by the process of the present invention are recovered from the organic phase of the two-phase system in any suitable manner well-known by those skilled in the art. The cyclic oligomeric polycarbonates are dissolved in the organic phase and may be recovered by evaporation of the solvent which yields a solid product. Washing techniques and well-known purification techniques may be used when purer forms of the cyclic oligomeric polycarbonates are required.

Various combinations of reagents and catalysts may be used in the process of the present invention without adversely effecting the process or the products. For example, a mixture of different metal salts of dihydric phenols may be used in the interfacial polycondensation to provide the cyclic oligomeric polycarbonates prepared by the process of the present invention.

When a 1:1 ratio of phosgene and the di-sodium salt of bisphenol-A was used with a 20 minute addition time, it was found that the level of polymer steadily increased with time. An HPLC analysis revealed that after 5 minutes, 29% polymer was present; after 18 minutes, 49% polymer was present (at which time all of the di-sodium salt of bisphenol-A had been added); and after 22 minutes, the reaction medium became extremely viscous, and HPLC analysis became impossible because of the high viscosity. Under the same set of conditions and a 35-minute addition of the phosgene, the results obtained were nearly identical to the 20-minute addition time. However, when a shorter reaction time was used, and an excess of the di-sodium salt of bisphenol-A was used, the reaction could be stopped before forming the high molecular weight viscous polymer.

The cyclic oligomeric polycarbonates prepared by the process of the present invention are generally a mixture of cyclic oligomeric polycarbonates and consist essentially of oligomers having degrees of polymerization from 2 to about 30 and preferably to about 20, with a major proportion being up to about 12 and a still larger proportion up to about 15. These polymers are defined herein as "low polymers". Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures of this invention contain very low proportions of linear oligomers. In general, no more than about 10% by weight, and most often no more than about 5%, of such linear oligomers should be present. Although the mixtures of this invention generally contain a greater amount of "high polymer", that is polymers (linear or cyclic) having a degree of polymerization greater than about 30, than the mixture prepared from the bischlorofomates as discussed above, the simplicity of the process of the present invention offsets this disadvantage. The low proportions of linear oligomers and the acceptable proportions of "high polymer", coupled with the relatively low melting points and viscosities of the cyclic oligomer mixtures, contribute to their utility as resin precursors, especially for high molecular weight polycarbonate resins, as described and well-known in the art.

The following specific example describes the novel process for making cyclic oligomeric polycarbonates of the present invention. They are intended for illustrative purposes only and should not be construed as a limitation.

EXAMPLE

A 0.66 molar solution of di-sodium bishpenol-A was prepared by dissolving 30 grams of bisphenol-A in 180 ml. of 1.5 molar sodium hydroxide under a nitrogen atmosphere.

A 300 ml. Morton flask equipped with a mechanical stirrer, phosgene inlet, pH probe, dry ice condenser, and addition funnels for the addition of aqueous sodium hydroxide and aqueous di-sodium salt of bisphenol-A, was charged with 162 ml. of methylene chloride, 25.0 ml. of water, 1.07 ml. of triethylamine, 25.0 ml. of aqueous di-sodium salt of bisphenol-A as prepared above, and enough of a 50% (by weight) aqueous sodium hydroxide solution to maintain a pH of approximately 12.0 in the mixture. The ratio of the triethylamine to the methylene chloride was 0.0065 ml. to 1.0 ml.

After heating the reaction mixture to reflux, phosgene was introduced at a rate of 0.8 gram per minute for 5.0 minutes. The remaining 61 ml. of di-sodium salt of bisphenol-A and sufficient aqueous sodium hydroxide to maintain a pH of 11.5 to 12.0 in the reaction mixture was also concurrently added over 5.0 minutes. One minute after phosgene addition was complete, a sample was removed for analysis; the phases of the two-phase mixture were separated; and the aqueous layer was washed with methylene chloride. The combined organic phases were washed once with the dilute sodium hydroxide, once with 10% hydrochloric acid, once with 1% hydrochloric acid and once with water and thereafter dried with magnesium sulfate. The material was filtered, and the filtrate was concentrated in vacuo and left in a drying oven overnight. This yielded 6.7 grams of a white solid material which was a 65% yield of carbonates based on phosgene utilization. HPLC analysis indicated approximately 45% polymer.

While the invention has been described with respect to the preferred embodiments, it will be apparent that certain modifications and changes can be made without departing from the spirit and scope of the invention and, therefore, it is intended that the foregoing disclosure be limited only by the claims appended hereto.

What is claimed is:

1. A process for making cyclic oligomeric polycarbonates from a water soluble metal salt of a dihydric phenol, comprising:
   (a) mixing the water soluble metal salt of a dihydric phenol with an aqueous solution of a strong base and a polymerization catalyst in an inert organic solvent;
   (b) heating the mixture;
   (c) adding a carbonyl halide, additional strong base and additional water soluble metal salt of a dihydric phenol to the heated mixture to form the cyclic oligomeric polycarbonate; and
   (d) recovering the cyclic oligomeric polycarbonate.

2. The process of claim 1 wherein the metal salt of a dihydric phenol has the formula $$MO-A_1-Y-A_2-OM$$

wherein each of $A_1$ and $A_2$ is a monocyclic divalent aromatic radical; Y is a bridging radical in which one or two atoms separate $A_1$ and $A_2$; and M is an alkali metal or an alkaline earth metal.

3. The process of claim 2 wherein the metal salt of a dihydric phenol is the sodium salt of bisphenol A.

4. The process of claim 2 wherein the metal of the metal salt of a dihydric phenol is selected from the group consisting of sodium, potassium, lithium, calcium and magnesium.

5. The process of claim 1 wherein the strong base is an alkali metal hydroxide.

6. The process of claim 5 wherein the alkali metal hydroxide is sodium hydroxide.

7. The process of claim 1 wherein the polymerization catalyst is triethylamine.

8. The process of claim 1 wherein about 0.02 mole to about 0.10 mole of catalyst is added to the mixture.

9. The process of claim 1 wherein about 10 to about 20 percent by weight of the water soluble metal salt of a dihydric phenol is added to the mixture prior to heating, and about 80 percent to about 90 percent by weight of the water soluble metal salt of a dihydric phenol is added to the mixture after phosgenation has begun.

10. The process of claim 1 wherein the additional strong base and additional water soluble metal salt of a dihydric phenol are concurrently added to the mixture over a period of time from about 5.0 minutes to about 30.0 minutes after phosgenation has begun.

11. The process of claim 1 wherein a sufficient amount of strong base is added to the mixture to maintain the pH of the mixture at about 11.0 to about 14.0.

12. The process of claim 1 wherein the mixture is heated at a temperature sufficient to reflux the mixture.

* * * * *